United States Patent [19]

Bair et al.

[11] 4,294,006
[45] Oct. 13, 1981

[54] AUTOMATIC CONTROL FOR WIRE CRIMPING MACHINE

[75] Inventors: Eugene C. Bair; Willard C. Hopkins, both of Holland, Mich.

[73] Assignee: General Electric Company, Fort Wayne, Ind.

[21] Appl. No.: 86,000

[22] Filed: Oct. 18, 1979

[51] Int. Cl.³ .................... H01R 43/04; B23P 21/00
[52] U.S. Cl. ................................ 29/701; 29/596; 29/707; 29/720; 29/736; 29/753; 72/7; 72/441; 318/601
[58] Field of Search ............... 29/596, 732, 736, 753, 29/720, 701, 702, 707; 72/7, 441; 318/569, 591, 601

[56] References Cited

U.S. PATENT DOCUMENTS

| | | | |
|---|---|---|---|
| Re. 30,001 | 5/1979 | Kindig | 29/596 |
| 3,962,780 | 6/1976 | Kindig | 29/596 |
| 4,035,910 | 7/1977 | Kindig | 29/753 X |
| 4,051,594 | 10/1977 | Kindig | 29/596 |
| 4,148,137 | 4/1979 | Kindig | 29/732 |

*Primary Examiner*—Carl E. Hall

*Attorney, Agent, or Firm*—Ralph E. Krisher, Jr.

[57] ABSTRACT

A preprogrammed microprocessor controlled apparatus for controlling automatic wire crimping equipment. The equipment disclosed is adapted to perform, in automatic sequence, a plurality of wire crimping steps on a dynamoelectric machine such as a motor. A wide variety of crimp height settings is selectively inserted by the equipment operator to achieve optimum crimp height for each crimp step to be performed. The crimp height setting mechanism includes an eccentric cam positioned by means of a pulse operated stepper motor with correct positioning indicated by a feed back pulse train from the cam shaft position encoder which pulse train is compared with the input information established by the equipment operator. Automatic and semi-automatic sequencing modes of operation are provided as determined by input selections established by the equipment operator. A stuffer wire control mechanism is also disclosed with provision for automatically determining an incorrect stuffer wire operation and for providing a sequence of operation enabling the equipment operator to correct the stuffer wire operation in a given crimp step.

17 Claims, 18 Drawing Figures

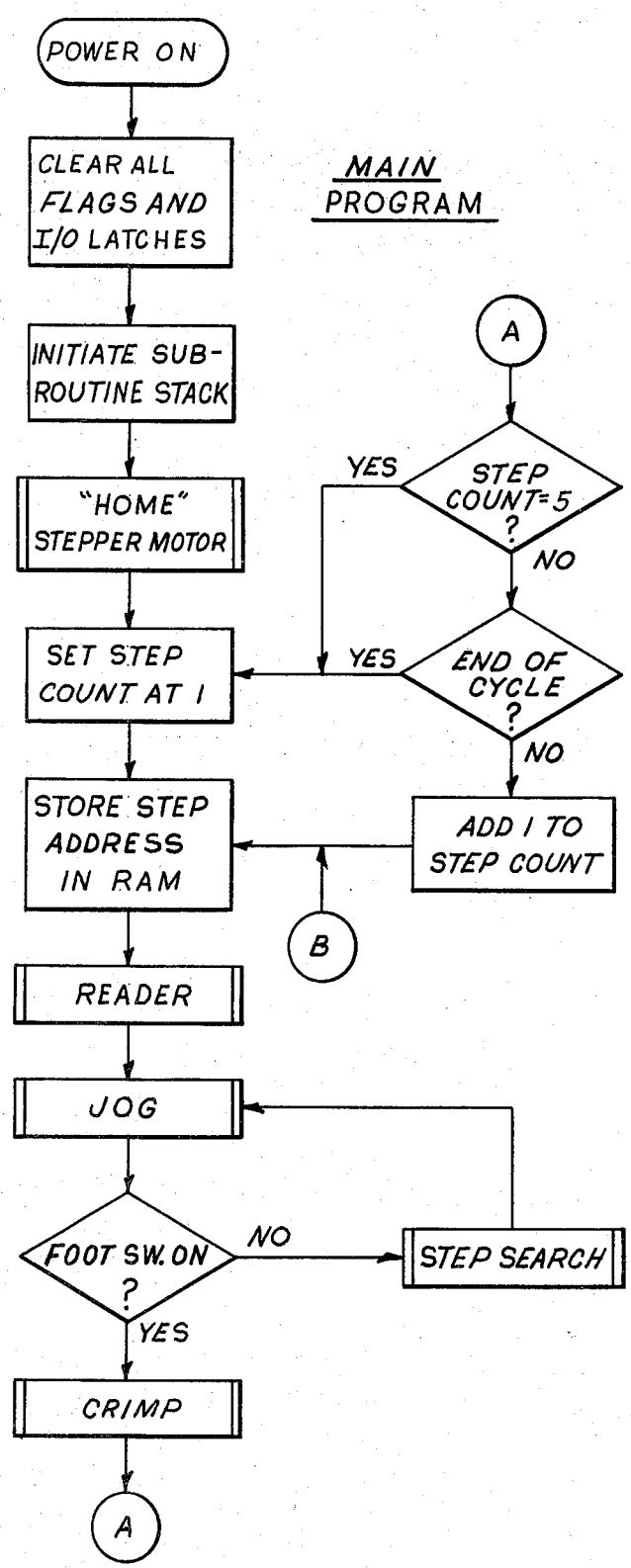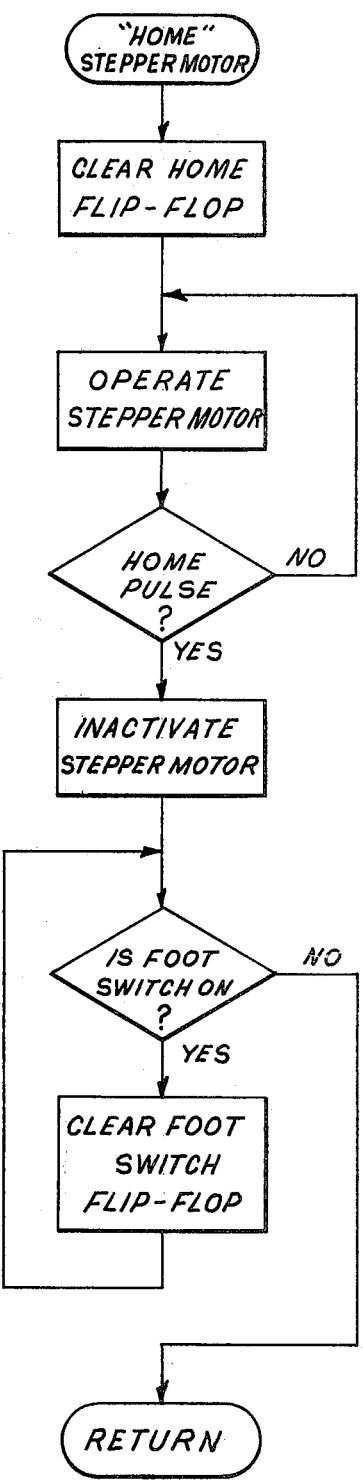

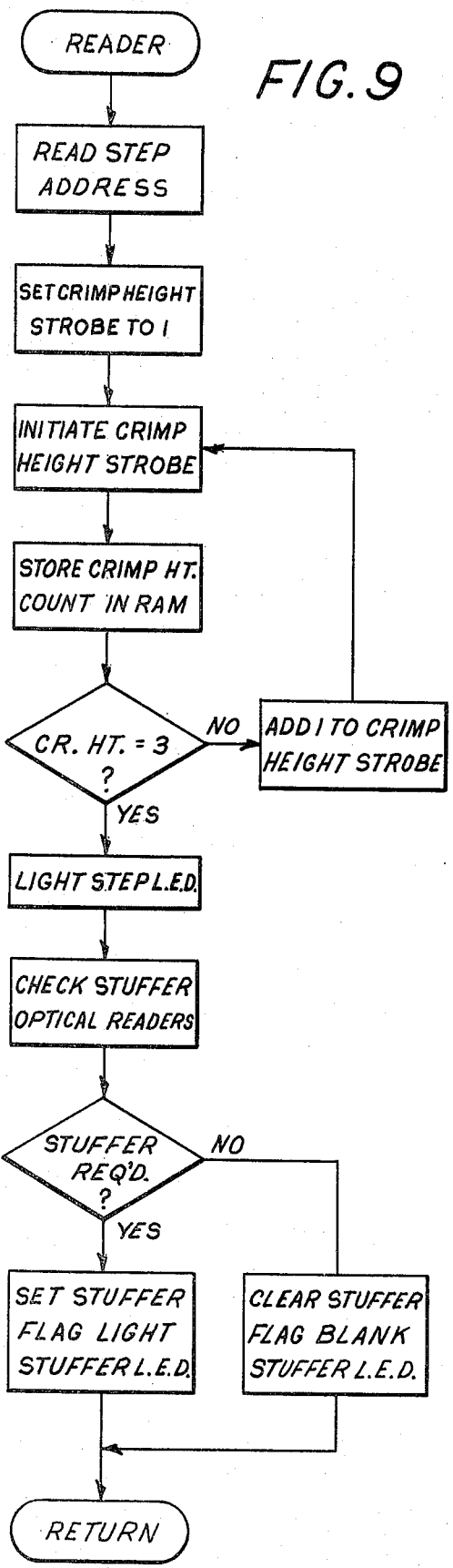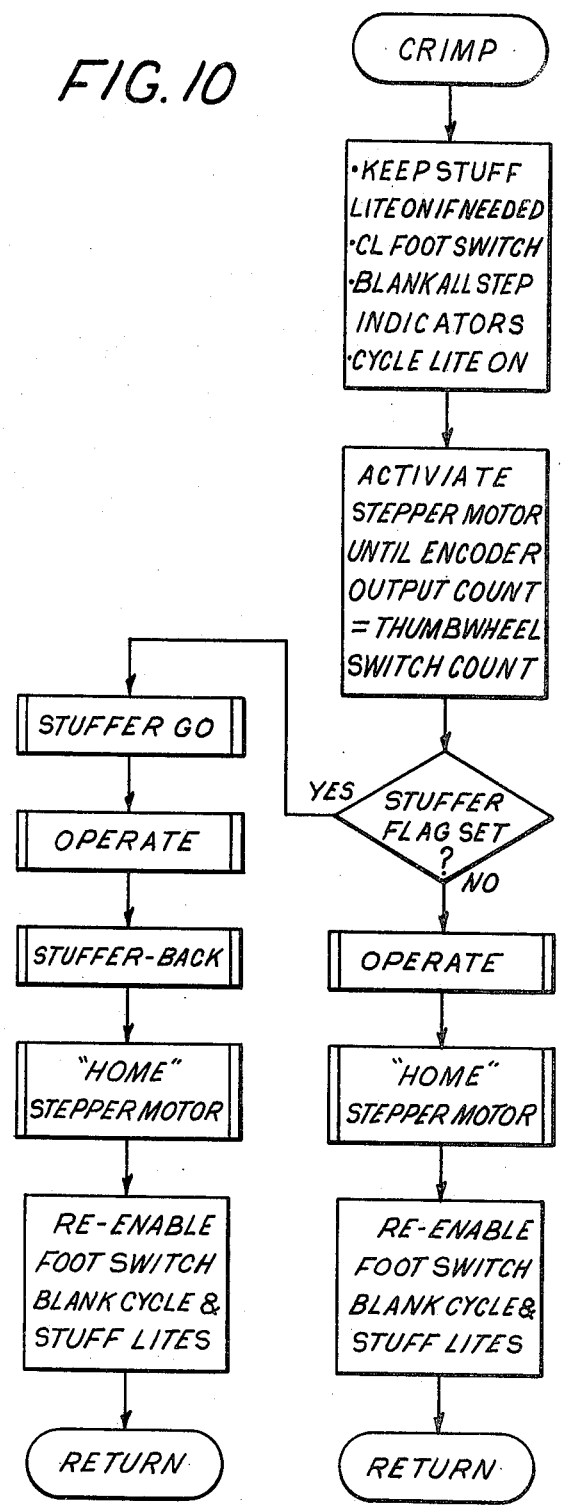

AUTOMATIC CONTROL FOR WIRE CRIMPING MACHINE

CROSS REFERENCE TO RELATED APPLICATION

This application is related to copending application Ser. No. 85,992 in the names of the inventors Alan L. Kindig and Albert J. Wesseldyk, filed concurrently herewith and the entire disclosure thereof is incorporated herein by reference.

BACKGROUND OF INVENTION

This invention relates to an automatic control for wire crimping machines and more particularly to an electronic control circuit utilizing a preprogrammed microprocessor for making a wide variety of preselected crimping connections on magnet wire leads of an inductive device such as a dynamoelectric machine.

In the manufacture of dynamoelectric machines, for example, motors, the exitation windings or coils are usually made of magnet wire, i.e. copper or aluminum wire covered with a suitable layer of insulation. It has now become accepted practice to utilize semi-automatic equipment to make inexpensive crimped connections when interconnecting leads or taps from the coils of the motor with one or more other wires. However, it is also known that it is important, particularly for more demanding applications such as hermetic motors, to maintain highly precise control over the crimping operation so that the crimped connections will retain suitable conductivity characteristics over a long period of time.

Experience has shown that for the making of reliable crimped connections it is important to control the final height of the crimped connection as a function of the cross-sectional area or size of the conductors within the crimped connector. Information concerning optimum crimped connector height for given connector size is readily available from crimp connector suppliers. Thus, it has previously been found to be desirable to provide apparatus for varying the final crimped connector height and, if necessary, for feeding a "stuffer wire" to a crimping station in the crimp machine for insertion into the crimp clip just prior to performing the crimp operation. The purpose of the stuffer wire, a small piece of excess wire, is to assure that the space within the crimped connector of a given height is completely filled with conductive material so as to maintain a proper conductive relationship.

An example of one known form of mechanism for varying or quickly setting the final crimped connector height is disclosed in U.S. Pat. No. 4,051,594 issued Oct. 4, 1977 and assigned to the assignee of the present application. In this approach, a pneumatically operated lever arm and toggle linkage arrangement is provided wherein a generally L-shaped lever arm is supported at one end by a rotatable horizontal shaft, the vertical positioning of the shaft, and correspondingly the "at rest" or starting position of the crimper mechanism, is adjustable by rotation of an eccentric cam which is integrally formed on the shaft and bears against a stationary surface. The other end of the lever arm is connected to a pneumatic ram. A vertically movable crimper device is attached via a toggle link to the central portion of the lever arm by means of a pivot pin. In operation, the pneumatic ram is activated and the crimper device is lowered vertically into the operative crimp position to the exact height desired which is determined by the rotational setting of the eccentric cam. The desired rotational setting of the cam is predetermined during the equipment set-up procedure to achieve the proper crimp height with the particular crimp tooling being employed at the crimp station. In the embodiment disclosed in the aforementioned patent, the eccentric cam can be adusted to either of two different crimp height settings in the course of a complete crimping cycle. As the term is used in this specification, a complete cycle may include one or more individual crimping operations hereinafter referred to as crimp steps. Selection of the desired setting is accomplished by means of a pneumatically operated rack and pinion mechanism with adjustment of the settings being made possible by means of an adjustable stop nut arrangement on the pneumatic cylinder. However, such adjustments are normally possible only during the equipment set-up procedure, are time-consuming, and are subject to reliance on the set-up specialist for accurate setting.

It is, therefore, desirable that means be provided for establishing and automatically implementing a variety of crimp height settings to be available during one or more crimp steps of a complete crimp cycle.

It is a further object of the invention to provide control apparatus which permits convenient, reliable and rapid changing of the crimp height setting selections by the equipment operator without the necessity for relying on a mechanical set-up specialist to make the change.

As previously mentioned, it is sometimes necessary to insert an auxiliary wire piece or "stuffer wire" into the crimp connector before the actual crimp is made in order to provide a proper electrical interconnection for a given size of crimp connector. The machine of the aforementioned patent does include an automatic stuffer wire insert mechanism, however, there is no automatic means to determine the existence of an improper stuffer wire insert operation, it being left up to the operator to determine, by visual inspection, the existence of a problem and the need, therefore, to repair the connection.

Consequently, it is a further object of the present invention to provide automatic control apparatus which is responsive to an improper stuffer wire operation during the course of the stuffer operation so as to provide a readout indicative thereof automatically to the operator and to additionally provide manually actuable steps for correcting the problem.

During the course of a crimping cycle, the equipment operator may wish to interrupt automatic operation of the equipment, for example, to select a crimp step out of sequence, or to incrementally advance through discrete increments of a crimp step so as to identify and correct an improper crimp step function. There are, of course, other possible reasons for desiring to interrupt automatic sequencing of the crimp cycle. It is, therefore, a further object of the invention to provide apparatus for enabling such an interruption without losing track of the step in the cycle at which the interruption occurred so that the required step in the automatic cycle may be automatically reverted to at the completion of the interrupt operation.

SUMMARY OF THE INVENTION

In accordance with the invention, therefore, there is provided automatic control apparatus for wire crimping equipment adapted to make, during a crimp cycle having one or more crimp steps, electrical interconnections with one or more magnet wire segments extending from windings supported on the core of a dynamoelectric machine. The equipment with which the control apparatus is especially adapted to cooperate includes a crimp height setting mechanism which is substantially infinitely variable over a predetermined range of maximum and minimum height limits. The control apparatus of the invention comprises, first input means for establishing the number of crimp steps to be performed and for generating a signal representative of each step; and second input means for establishing any desired crimp height setting, within a range of maximum and minimum limits, for each crimp step to be performed and for generating a signal representative of each such crimp height setting. The apparatus of the invention further comprises means operative in response to the first and second input means during each crimp step for actuating the crimp height setting mechanism to the setting established for that step and also comprises crimp actuating means for initiating a crimp operation at each such crimp step.

In a further preferred form of the invention, an input signal representative of a numerical count corresponding to the desired crimp height setting is established in the control apparatus, and a pulse actuated stepper motor is driven to actuate the crimp height setting mechanism toward the desired setting. Encoding means responsive to positioning of the crimp height setting mechanism, is employed to generate a pulse train output indicative of the stepped positioning of the crimp height setting mechanism. Logic circuit means is then employed for comparing the numerical count input signal to the output of the position encoding means to terminate actuation of the crimp height setting mechanism when the two count values are in a predetermined relationship, such relationship being preferably equal to each other, so as to establish the desired setting of the crimp height setting mechanism.

In a still further preferred form of the invention, the control apparatus includes microprocessor means for sequencing the control apparatus in an automatic mode through each of the predetermined crimping steps and also includes user-operated means for selecting, under the control of the microprocessor means, a semiautomatic mode of operation in which individual operations within a crimp step may be selectively operated by the user, the progression from one individual crimp operation to the next being controlled at the option of the user.

BRIEF DESCRIPTION OF THE DRAWINGS

FIGS. 7 through 16 illustrate program flow charts for the main program and subroutine programs useful in explaining the operation of the microprocessor control circuit of FIG. 3.

DESCRIPTION OF THE PREFERRED EMBODIMENT

Figure 1:
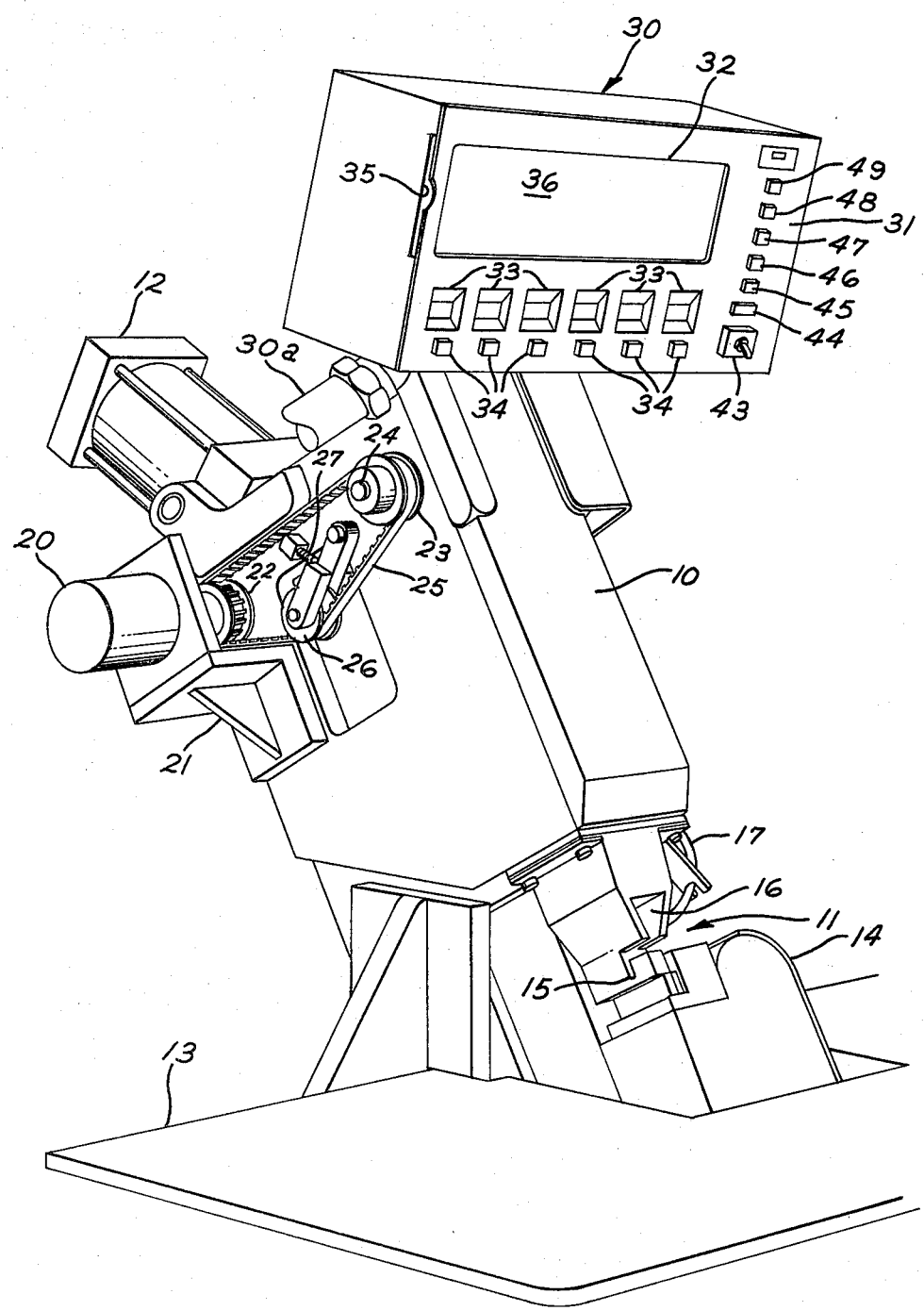
FIG. 1 is a perspective view of a wire crimping machine constructed in accordance with one form of the present invention.

Referring now to FIG. 1, there is shown therein, in only one preferred illustrative form, automatic wire crimping equipment including a main housing 10, a wire crimping station 11, a pneumatic power ram 12 for actuating a crimping mechanism at the crimping station 11, and a support table 13 on which the dynamoelectric machine, such as a motor, may be placed while wire crimping operations are performed thereon. The mechanical details of the wire crimping equipment of FIG. 1 are disclosed in the aforementioned copending application. An understanding of the structure and operation of the control apparatus of the present invention may also be enhanced with reference to an earlier disclosure of wire crimpoing equipment found in the aforementioned U.S. Pat. No. 4,051,594 and the entire disclosure thereof is incorporated herein by reference.

Generally speaking, and with reference to the aforementioned disclosures, a conventional crimp connector clip (not shown) is supplied by a clip feed mechanism 14 to the crimp station 11 where it is positioned within the crimp tooling in crimp station 11. The wires to be interconnected are inserted at slot 15 into the crimp connector clip. As is well known in this art, these wires may be the end segment of a magnet wire with its associated lead wire connector or it may be a pair of interpole magnet wire segments that have become broken and are to be repaired by a crimp operation. The equipment operator then actuates the pneumatic power ram 12 by means of a foot switch (not shown) which causes the crimping mechanism to be forced down, via the lever arm/toggle linkage arrangement previously described, into the crimp station compressing the crimp connector clip around the wires. A plexiglas window 16 is provided over crimp station 11 for visual observation by the equipment operator of the crimping operation. In the event a stuffer wire is required, as previously described, it is fed through a guide tube 17 by means of a stuffer wire feed mechanism such as that which is fully described in the aforementioned copending application.

As previously described, it is important that the crimp connection be carefully controlled in accordance with known principles of the wire crimping art. To this end, there is included within housing 10 a crimp height setting mechanism based on the use of an eccentric cam such as that described in U.S. Pat. No. 4,051,594. Unlike the patent disclosure, the elongated shaft on which the eccentric cam is positioned extends through both sides of the housing 10 in the present equipment. The shaft extending through the far side of housing 10 is preferably connected via a belt drive mechanism to a DC stepper motor for reasons which will be explained subsequently. The stepper motor and associated belt drive to the eccentric cam shaft are not visible in the showing of FIG. 1, however, the structure is fully disclosed in the aforementioned copending application and it need only be noted that in an actually constructed embodiment, a 1:2 step down drive ratio is employed between the motor and cam shaft pulleys although other drive ratios might also be employed. The opposite end of the shaft 24, as is visible in the showing of FIG. 1, is connected via a cam shaft pulley 23 and a drive belt 25 to a pulley 22 comprising a timing belt system which is attached to a conventional shaft position encoder 20 mounted on mounting bracket 21. An accurate relationship between the degree of rotation of shaft 24 and the corresponding positioning of the shaft of encoder 20 is maintained by virtue of the drive belt system which also includes a tension pulley 26 to which force is applied by means of spring 27. In the embodiment of FIG. 1, a 1:1 drive ratio is employed from pulley 23 to pulley 22 although it will be appreciated that other drive ratios might also be employed.

Figure 2:
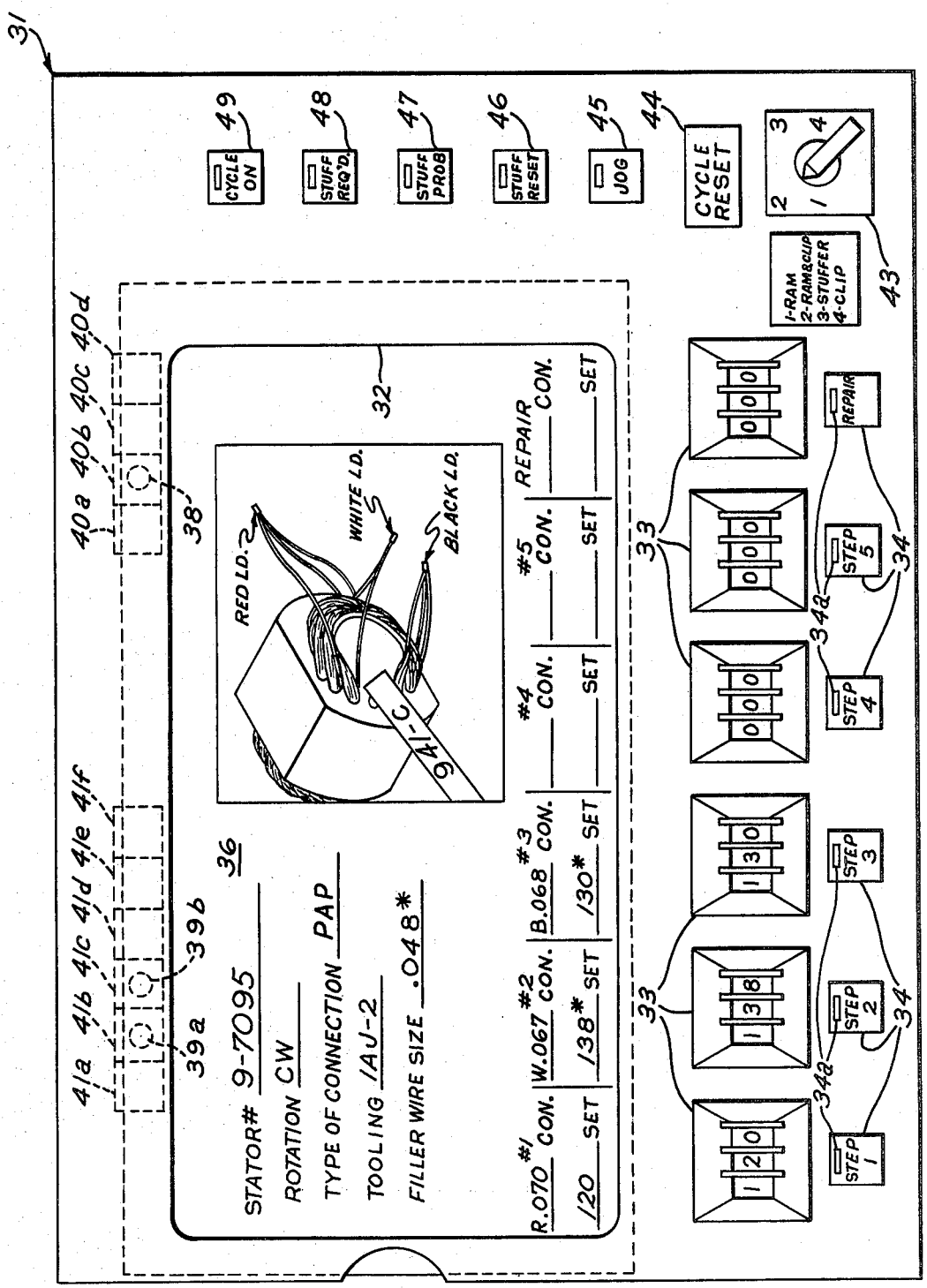
FIG. 2 is a plan view of the console control panel for the wire crimping equipment of FIG. 1.
Figure 5:
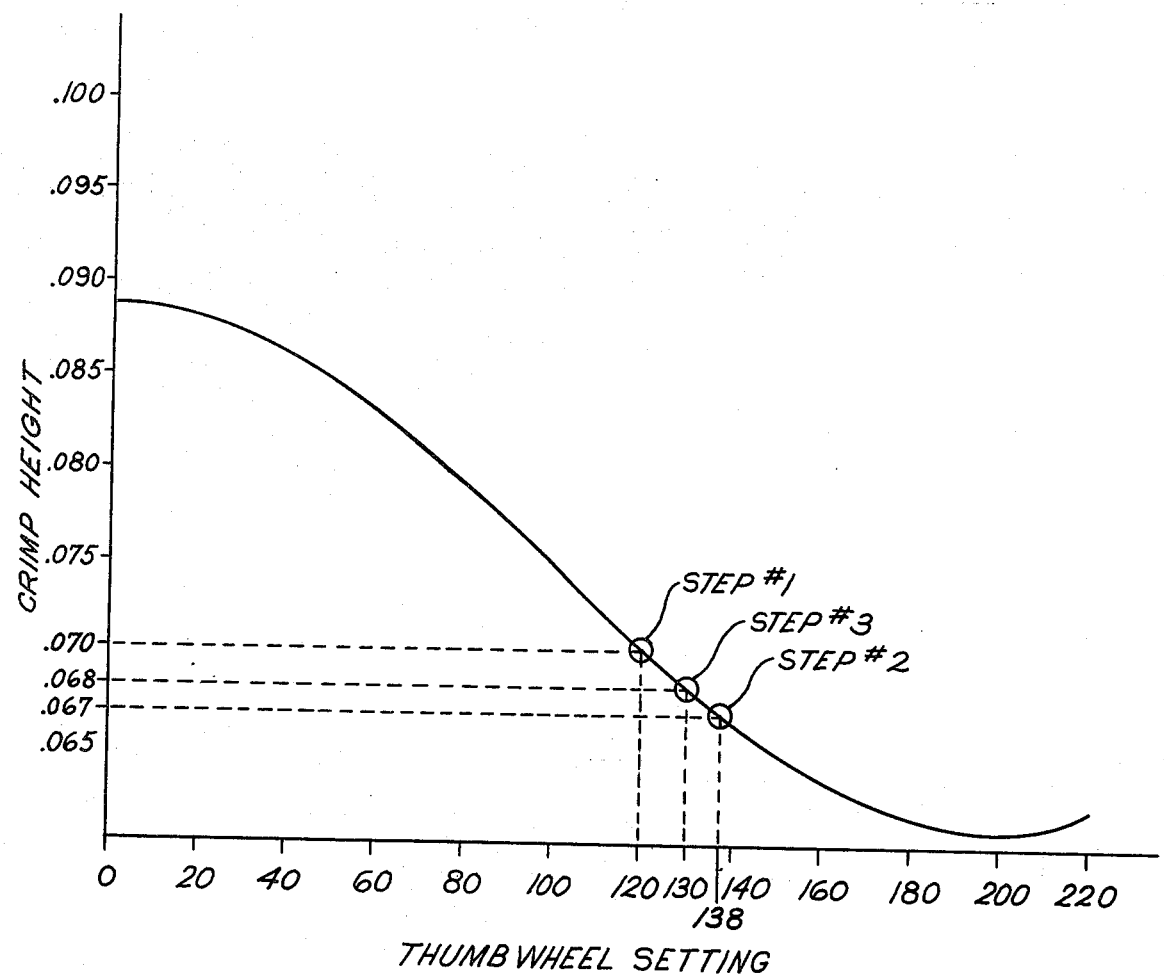
FIG. 5 is a graph representing the relationship between actual crimp height and input numerical control values used in the operation of the control circuit of FIG. 3.

The bulk of the control apparatus of the present invention is included within the control console 30 which is mounted on the equipment housing 10 so as to be easily seen by the equipment operator. Additional power supply equipment may be positioned in a remote unit (not shown), the connections for which are fed to control console 30 by means of conduit 30a. Referring jointly to FIGS. 1 and 2, the control panel 31 of operator control console 30 includes a plurality of control switches and indicator lights, described more fully hereinafter, with which the equipment operator interfaces during the operation of the crimping equipment. A crimp instruction data card 36 is inserted through slot 35 into a card receiving means positioned behind control panel 31 such that card 36 is visible to the operator through window 32. Each model of a motor on which crimping operations are to be performed has associated with it a unique data card bearing specific information to be used by the operator in establishing within the control apparatus of the invention predetermined crimp height data and other information needed to perform specific crimping operations unique to the motor model involved. On the face of the data card 36, as seen in FIG. 2, it will be noted there are three crimp steps to be performed and there is a different crimp height requirement for each of the crimp steps 1 through 3. Below each actual crimp height notation, there is a three digit number or numerical count which is representative of the corresponding crimp height which has been predetermined to exist for a given set of crimp tooling used in the crimp station 11 of the crimping equipment. A calibration graph, as shown in FIG. 5, can be constructed emperically for each set of tooling showing the relationship between the numerical count and the desired crimp height. In reality, each of the numerical counts on card 36 and the graph of FIG. 5 represents the number of incremental pulses received from the encoder 20 when advanced by the stepper motor, and correspondingly the crimp height setting cam, from its initial or home position to the desired crimp height setting required for the particular crimp step involved.

In the control console of FIG. 2, there is provision for a maximum of six possible crimping steps which is considered adequate for most normal cycles of motor wire crimping operations, although fewer or more steps might be provided, as desired. For example, in the wiring equipment of FIGS. 1-6, Steps 1-5 are available for use in the normal production cycle and Step 6 is set aside through programming means to be used as a repair or other crimping operation. For each step, there is included a three digit thumbwheel switch comprising first input means for establishing any desired crimp height setting, within a range of maximum and minimum limits, for each crimp step to be performed. When using an eccentric cam arrangement as just described, the limits are determined by the eccentric throw of the cam, for example, a range of about 0.30 inch. Thus, after inserting the data card, the equipment operator inserts the numerical count shown on the data card for the crimp step involved into the thumbwheel switches.

As will be seen subsequently, the control apparatus of the invention normally sequences the crimping functions through each step automatically commencing with Step #1. However, at times it may be necessary or desirable for the equipment operator to select any one crimping step out of sequence and this is accomplished by means of step selection switches 34. Additionally, as seen in FIG. 2, there is included along the upper edge of card 36 indicia, such as a punched hole 38, which is provided in a predetermined location on the card in alignment with optical card readers 40a-d to indicate the number of crimping steps to be performed for this particular motor model. The punched hole is preferably inserted by a specialist at the time the card is initially made up for the motor model involved and the location of the hole corresponds to the total number of crimp steps to be performed, in this case three. In actual operation only four readers are needed since Step 1 is always performed and it is only necessary to indicate cycle completion only if more than one step is to be performed. Thus, hole 38 is located in the second reader position to indicate three crimp steps. Also, if stuffer wires are to be included in any of the crimping steps, this is indicated visually to the operator by asterisks next to the crimp height count on the data card 36 and also by means of edge indicia such as punched holes 39a and 39b also placed in predetermined spots on the card 36 in alignment with optical readers 41a-f. The readers 40 and 41 may be conventional devices comprised of LED optical emitters and solid state optical sensors which straddle the card as it is inserted into the card receiving slot 35.

Although the control apparatus of the invention is primarily intended to operate in a completely automatic mode to perform each complete crimping step, at times it may be desirable for the operator to cause the crimping equipment to operate in a semiautomatic mode in which individual operations or combinations thereof representing discrete incremental operations within a crimping step may be selectively actuated by the operator. To this end, there is provided a rotary selection switch 43 comprising, in part, means for establishing input conditions to the control apparatus representing the selection of any one or a combination of selected ones of particular operations within a crimp step. These operations may, for example, be the actuation of power ram 12 forcing the crimping mechanism down into the crimp station 11 and returning it to its rest position as well as a clip feed operation and optionally a stuffer wire operation. In an actually constructed embodiment of the wire crimping equipment herein described, this semi-automatic mode has been arbitrarily assigned the designation "JOG" and this terminology will be used in the further description of the apparatus of the present invention. Selector switch 43 is used to select the particular desired crimp operations while a combination indicator light and pushbutton switch 45 is used by the operator to actuate the individually selected crimp operation.

Cycle reset button 44 is used to return the cycle of operation to Step 1 at any time at the option of the operator as, for example, when a different program card 36 is inserted into slot 35 of the control console 30. Pushbutton 46 is a combination indicator light and pushbutton used in connection with the stuffer wire insert operation as are also indicator lights 47 and 48. Indicator light 49 indicates the existence of a crimping operation being performed.

Figure 3:
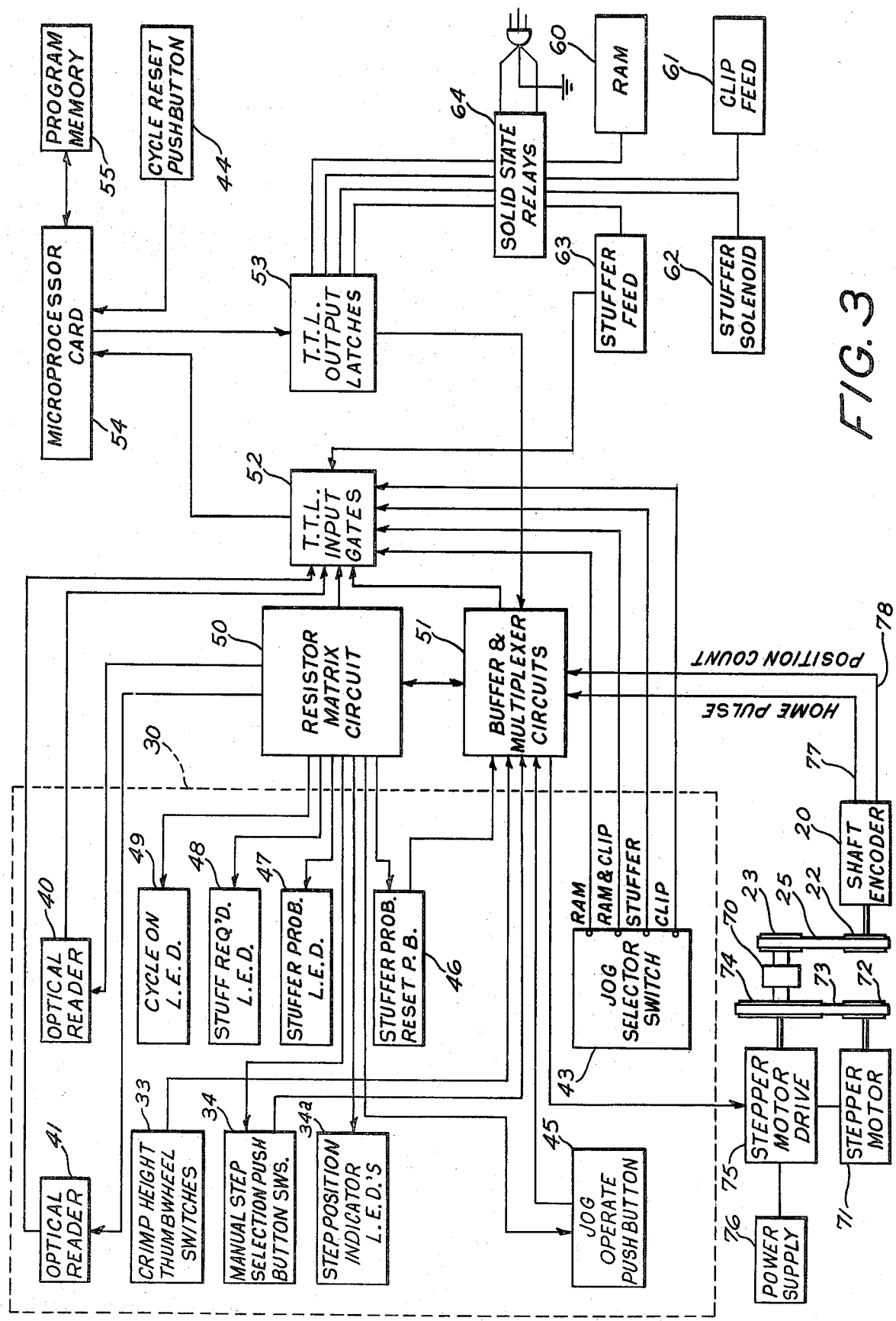
FIG. 3 is a block diagram of the control circuit embodied in the control apparatus of the present invention as used with the wire crimping equipment of FIG. 1.

Referring now to FIG. 3, the various input and output devices interfacing with the equipment operator are shown within the dotted line representing the control console 30. These devices interact through a resistor matrix circuit 50 and through buffer and multiplexer circuits 51 and through conventional input gates 52 and output latches 53 with a microprocessor system 54 which is preprogrammed by means of a program memory 55 in accordance with one preferred form of this invention as hereinafter described to operate the various functional control solenoids 60 through 63 via solid state relay circuits 64. The solenoids 60, 61 and 63 may be conventional solenoid valves, for example, of the type referred to in the aforementioned U.S. Pat. No. 4,051,594. Solenoid 62 is of the type fully described in the aforementiond copending application. The solid state relays 64 may be conventional zero voltage controlled triac switching circuits well known in the electronics art.

As previously described, the crimp height setting mechanism in the equipment of FIG. 1 includes an eccentric cam device 70 driven by a stepper motor 71 operating through a timing belt drive mechanism including motor pulley 72, belt 73 and cam input pulley 74 or other suitable means. The pulse train for driving stepper motor 71 is furnished under the control of the microprocessor in card 54 via the buffer and multiplexer circuit 51 which actuates motor 71 via a conventional stepper motor drive circuit 75 from a power supply 76.

The actual position of cam 70 is sensed by a shaft position encoder 20 which is driven from the cam mechanism by a timing belt drive including belt 25 and pulleys 22, 23 or other suitable means. On one output line 77 of encoder 20, a single home pulse is provided for each complete rotation of the shaft of encoder 20 while on a second output line 78, a pulse train is generated, one pulse for each rotational step of the encoder shaft.

Figure 4:
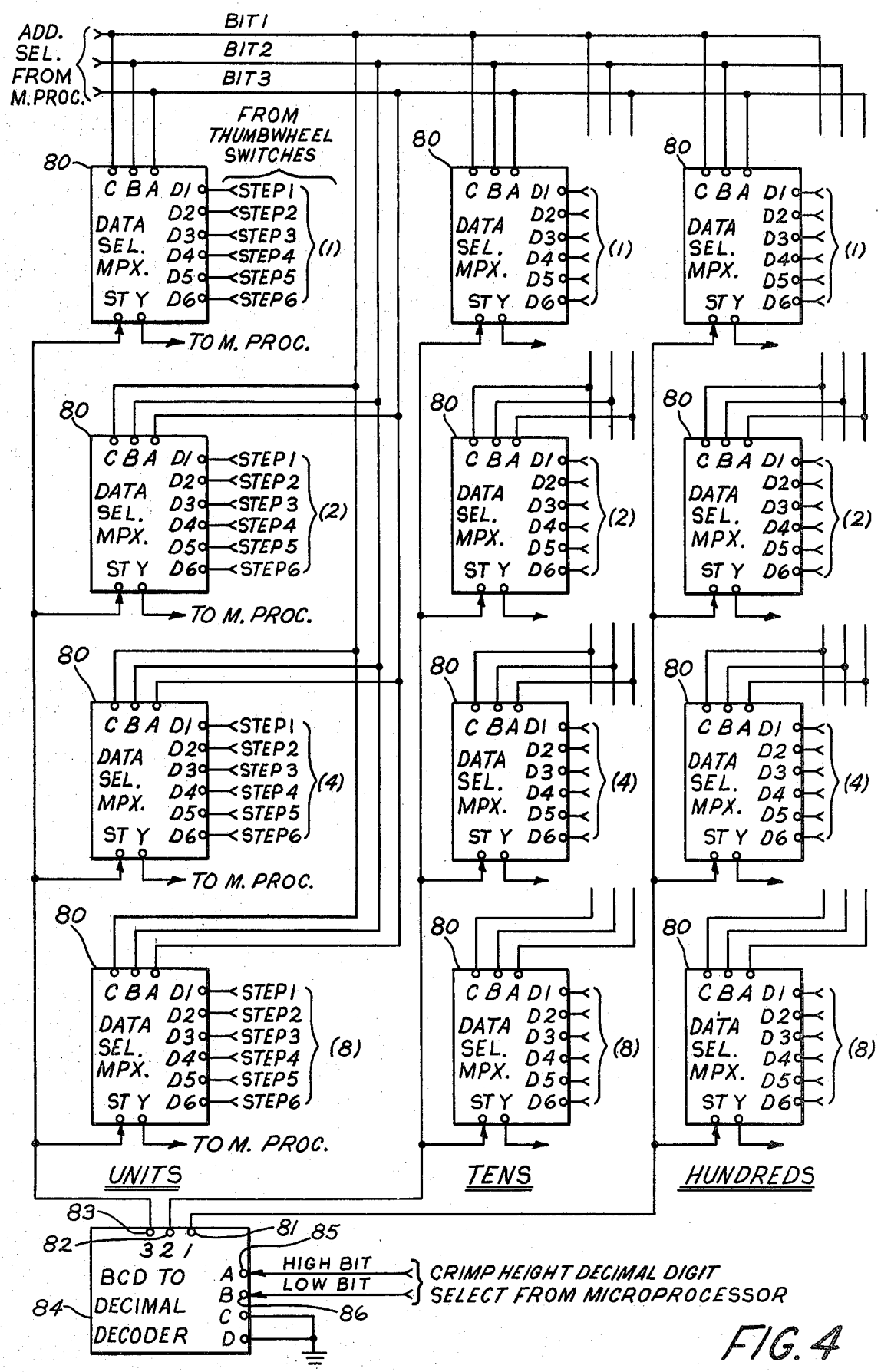
FIG. 4 is a logic diagram of a crimp height count selection circuit forming a part of the control circuit of FIG. 3.

Referring now to FIG. 4, there is shown the data selector multiplexer circuits incorporated in block 51 of FIG. 3 and which are used to transfer the crimp height count information from thumbwheel switches 33 into the appropriate storage registers on microprocessor card 54. Specifically, each of the thumbwheel switches 33 establishes the numerical count data in binary coded decimal form which is individually connected to input terminals D1 through D6 of multiplexer circuits 80. At appropriate times in the microprocessor program cycle, the binary inputs for the units, tens and hundreds positions on a given thumbwheel switch are conditioned by address select bits furnished from the microprocessor. The data is then read out of the multiplexers by means of strobe signals sequentially appearing on output lines 81, 82 and 83 of decoder circuit 84 under the control of data select bits applied to input terminals 85 and 86 from the microprocessor. Thus, each decimal digit on the thumbwheel switches 33 is read into the microprocessor storage in binary coded decimal form, it requiring three strobe cycles to complete the read-in procedure for each three digit switch.

Figure 6:
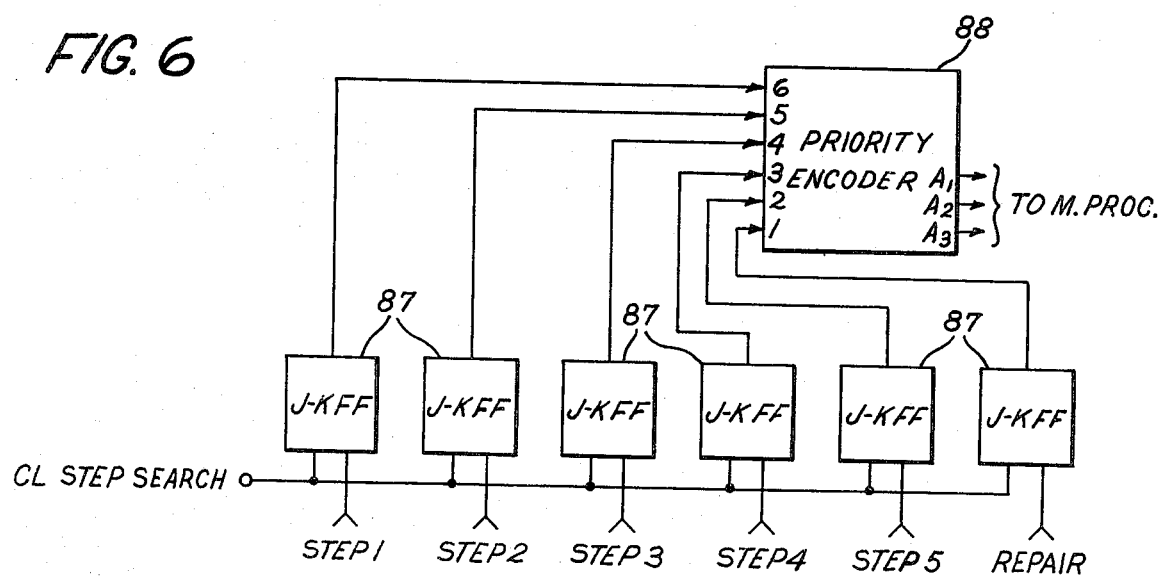
FIG. 6 is a logic diagram of a selection circuit used in the manual selection of individual crimp steps in the operation of the control circuit of FIG. 3.
Figure 11:
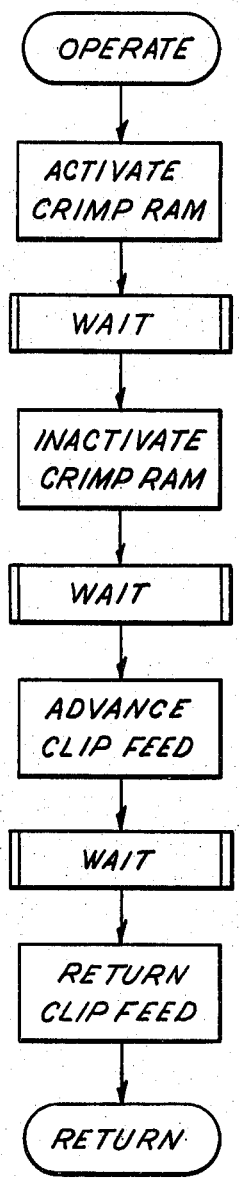

FIG. 6 illustrates the buffer-encoder circuit included in unit 51 of FIG. 3 which is used to input the manual selection of a crimp step from the manual step selection switches 34 to the microprocessor 54. A plurality of conventional J-K flip-flops 87 are conditioned by d.c. inputs from step selector switches 34 to provide inputs to priority encoder 88 which operates in a conventional manner to insure that only the highest order data line at the input thereof is encoded to the output. Additional J-K flip-flops are also used in conventional manner in unit 51 of FIG. 3 to buffer other inputs from the control console 30 pushbuttons and shaft encoder 20.

In an actually constructed embodiment of the invention, by way of illustration and without intention of being limited thereto, in FIG. 4, the data selector and multiplexer circuits might be type DM 8121 solid state circuits while the binary coded decimal to decimal decoder circuit might be a solid state circuit type DM 7442. The J-K flip-flops 87 may be type 7476 solid state circuits, and priority encoder 88 may be a type DM 74148 solid state circuit. Each of these solid state circuits are made by National Semiconductor Corporation, 2900 Semiconductor Dr., Santa Clara, Calif. In FIG. 3, microprocessor card 54 comprises an 8080A microprocessor, a crystal clock and direct memory access buffers and is available from PRO-LOG Corporation under the designation Microprocessor Card Model 8821. The TTL input gates 42 and TTL output latches 53 are available from the same firm under the designation Model No. 8114 and Model No. 8115-1, respectively. The program memory 55 is a conventional device and, in the actually constructed embodiment, an erasable program memory was employed as made by Intel Corporation, 3065 Bowers Ave., Santa Clara, Calif. under the designation Model No. B 2703.

Referring now generally to FIGS. 7 through 16, there will now be considered the program flow charts useful in understanding the operation of the control apparatus of the present invention and from which sufficient information is available for one skilled in the art to establish a suitable microprocessor control program for program memory 55.

Referring specifically to FIG. 7, the main program will now be considered. When power is applied to the control apparatus of FIG. 3, the first instruction is to clear all flags and input-output gates and latches and to prepare the microprocessor for initiation of a subroutine stack. The program is then directed into the first subroutine entitled "Home" stepper motor. In the Home routine shown in FIG. 8, the first functional instruction is given to operate the stepper motor which is accomplished by supplying the drive pulse train to drive circuit 75 of FIG. 3. The stepper motor is operated until a Home pulse is received on line 77 from the output of shaft position encoder 20 at which time the instruction is given to inactivate the stepper motor. The purpose of this operation is to set the stepper motor 71 and correspondingly the eccentric cam 70 to their respective index or Home positions preparatory to being actuated to the preselected crimp height setting later in the program. It should be understood that there are other sequences that can be embodied in the program represented by this flow chart such as, for example, immediately advancing beyond the Home position to the prescribed preselected crimp height setting for the next step. After this, if the foot switch flip-flop in unit 51 is on, the program loops at this position; if the foot switch is released, the foot switch flip-flop is cleared and the subroutine returns to the main program.

Having indexed the stepper motor to its initial or Home position, the crimp step counter in the microprocessor is set at 1 and this step address is stored in the random access memory of microprocessor 54. The main program then goes to the Reader subroutine shown in FIG. 9. In the Reader subroutine, the step address is applied to the multiplexer circuits of FIG. 6 and the crimp height data is read out from the thumbwheel switches in the manner previously described and stored in the random access memory of microprocessor 54. The process is recycled for each decimal digit of the Step 1 thumbwheel switch 33 at the end of which the LED 34A of step switch 34 is turned on. The next instruction in the Reader subroutine is to check the stuffer optical readers 41 to determine if a stuffer wire is required in step 1. For the card illustrated in FIG. 2 no stuffer wire is required for Step 1 which causes the stuffer flag to be cleared and the stuffer indicator LED to be blanked following which the Reader subsroutine returns to the main program of FIG. 7.

After the Reader subroutine, the main program enters the JOG subroutine. For the purpose of the present discussion, in connection with Step 1, it is assumed that the operator has not selected the JOG operation and thus, as will later be seen in connection with FIG. 15A, the subroutine returns directly to the main program. At this point, the foot switch flip-flop is again sensed to determine if the foot switch has been pressed after initiation of the cycle and assuming it has, the main program then enters the Crimp subroutine shown in FIG. 10.

In the Crimp subroutine, the first instruction is to clear the foot switch flip-flop, blank all step indicators and turn on the cycle light. In Step 1, the stuff light is not needed. After setting these initial conditions, the Crimp subroutine activates the stepper motor 71 until the pulse count at output line 78 of the shaft position encoder 20 equals the thumbwheel switch count previously stored in the random access memory during the Reader subroutine. At this time, the stepper motor 71 is stopped with cam 70 set at the desired crimp height setting and, since the stuffer flag has not been set, the Crimp subroutine enters the Operate subroutine shown in FIG. 11. As previously described, it is not necessary to limit the design of this program in this manner. That is, the stepper motor and cam assembly could be positioned to accommodate the six crimping cycles prior to this point in the flow chart. The Operate subroutine is straightforward in that it sequentially activates the crimp pneumatic ram 12, holds it in the down position for a predetermined wait period, deactivates the crimp ram 12 and after a short wait period advances the clip feed 14 and after an additional short wait period returns the clip feed 14 to its rest position. Following this, the Operate subroutine returns to the Crimp subroutine which then enters the Home subroutine to return the stepper motor 71 to its Home index position as sensed by the home pulse on line 77. The foot switch flip-flop is then re-enabled, the cycle light is blanked and the subroutine returns to the main program which determines that the step count is not equal to five (i.e. the step is in Step 1) and that the end of the cycle has not been reached (i.e. the compare signal from Step 3 sensed by optical rader 40 has not been reached). The program then instructs the microprocessor to move to the next higher step count and re-enters the main program ready to perform a new crimp operation now in Step 2 of the cycle.

Figure 12:
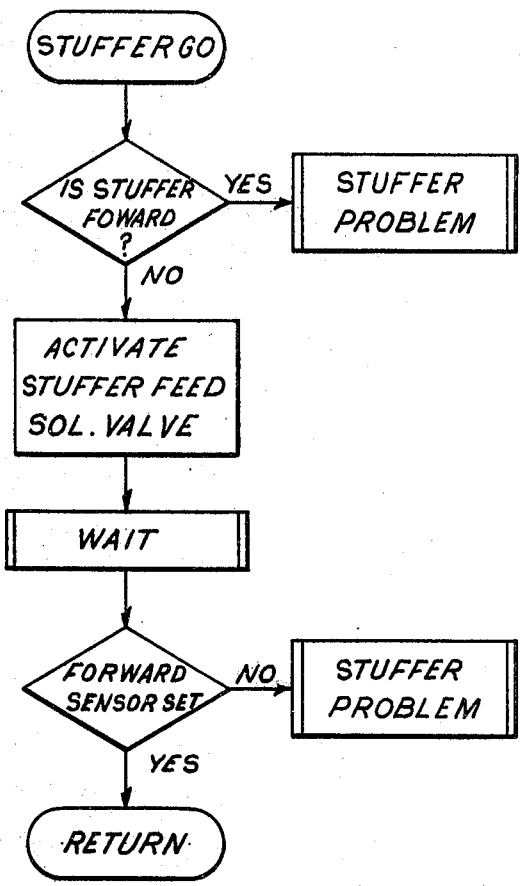
Figure 13:
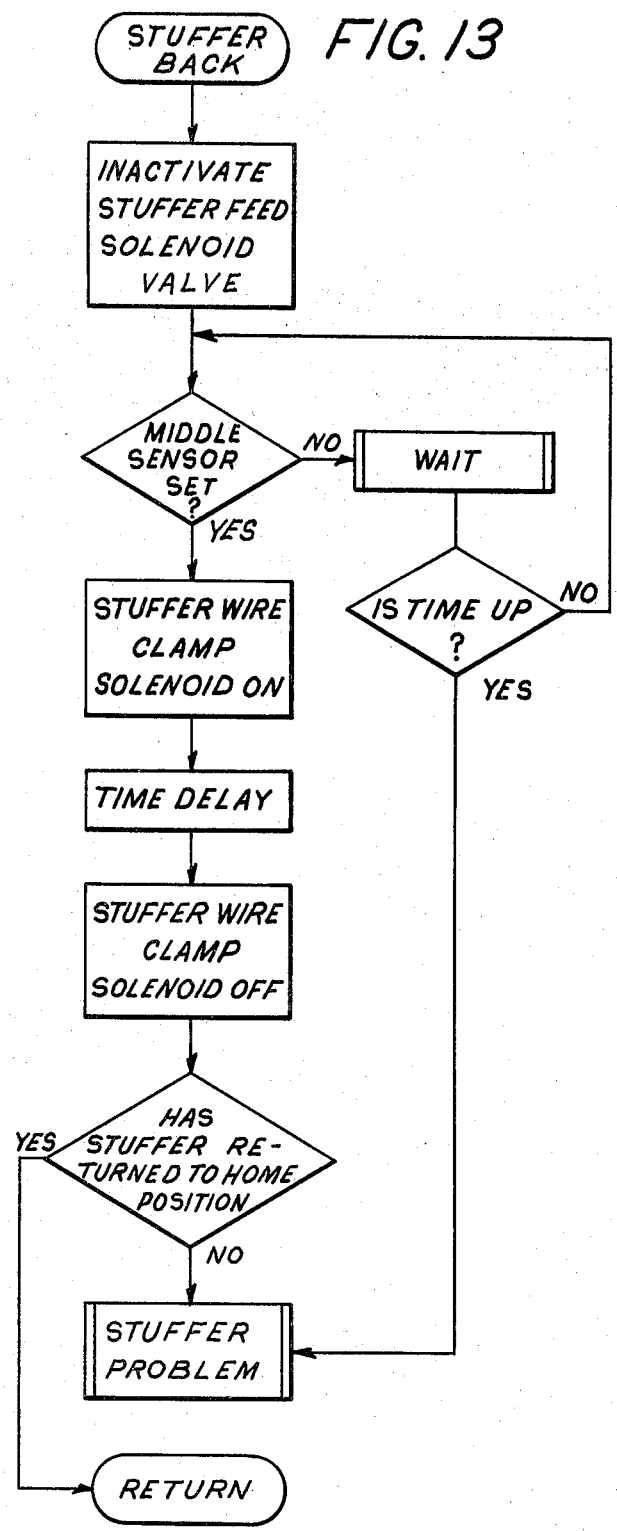
Figure 14:
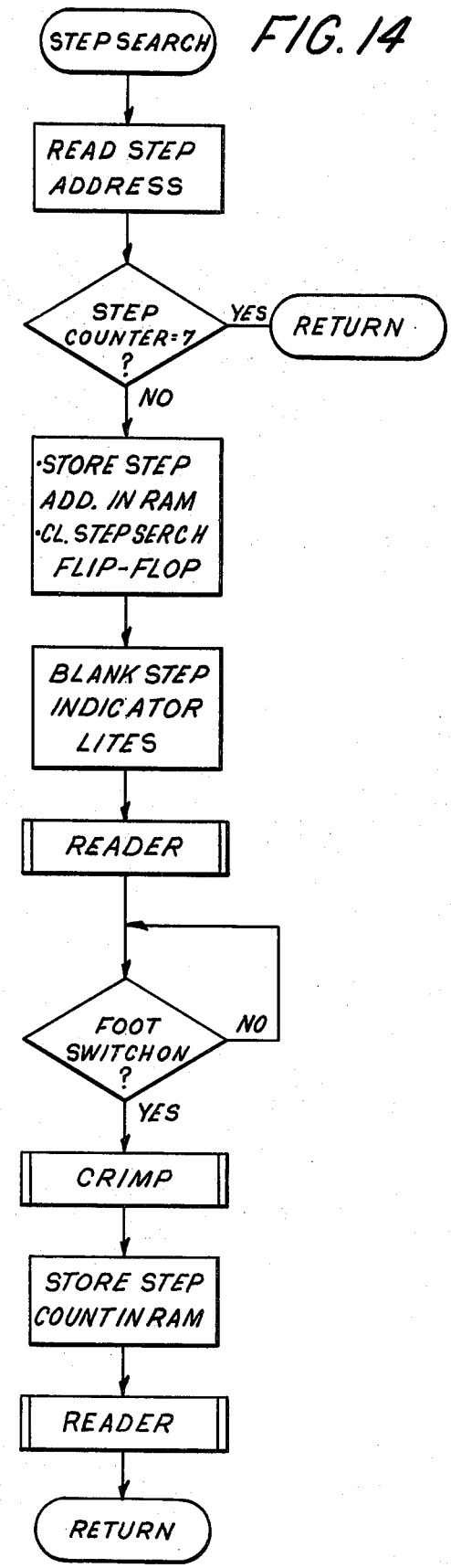

Referring to FIG. 2, the second step in the cycle requires the use of a stuffer wire as indicated by the punched hole 39a in card 36 and sensed by optical reader 41b. Thus, with reference to FIG. 9 in the Reader subroutine, after storing the new crimp height count in the random access memory (RAM), the output of optical reader 41b causes the stuffer flag to be set in the RAM and the stuffer LED to be lit. Assuming still that the operator has not selected the JOG function and has actuated the foot switch, the main program now enters the Crimp subroutine which operates in the manner previously described until reaching the determination that the stuffer flag has been set whereupon the Stuffer Go subroutine is entered as shown in FIG. 12. Here it should be mentioned that the stuffer feed mechanism includes position sensing devices which may be conventional magnetic sensors or Hall-effect devices located so as to sense three positions of the stuffer feed mechanism, namely, a ready or at rest position existing prior to insertion of the stuffer wire, a forward position in which the stuffer wire is fully inserted into a crimp clip and an intermediate position. In the Stuffer Go subroutine, the forward position sensor is initially sensed to determine that the feed mechanism is not improperly positioned initially in the forward or feed condition. Assuming it is not, the stuffer feed solenoid valve is activated and after a predetermined wait period, the forward position sensor is interrogated to indicate proper operation of the stuffer feed in the forward direction following which the Stuffer Go subroutine returns to enter the Operate subroutine which performs a crimp operation as previously described in connection with the crimp operation of Step 1. At the conclusion of the Operate subroutine, the Stuffer Back subroutine is entered as shown in FIG. 13. As part of the Crimp operation, the stuffer wire is automatically clipped by a blade on the crimper mechanism and the first instruction in the Stuffer Back subroutine is to inactivate the stuffer feed solenoid valve to pull the unused stuffer wire back into the stuffer wire guide 17. The intermediate position sensor on the stuffer feed mechanism is then sensed and the wire clamp solenoid is energized, releasing the grip on the stuffer wire for the balance of the feed mechanism return travel. After a suitable wait interval, the clamp solenoid is released. Positioning of the intermediate position sensor determines the length of the stuffer wire to be fed into the clip on the next cycle of the stuffer wire feed mechanism for use in the next crimp step. A check is then made to determine if the stuffer mechanism is in the home or at rest position, if not, the program goes to stuffer problem. Assuming proper operation of the feed mechanism and it has retracted to its normal at rest position, the subroutine then returns to the Crimp subroutine for indexing of the stepper motor 71 to its Home position following which the foot switch is reenabled and the cycle and stuff lights are blanked. At this point, the Crimp subroutine returns to the main program which advances as previously described to Step #3 in the cycle.

Referring again to FIG. 7, the main program again proceeds through the Reader and JOG subroutines, as previously described, except that now it will be assumed that the operator has not actuated the foot switch. This causes the main program to enter the Step Search subroutine shown in FIG. 14. In this subroutine, the first instruction is to read the step address from priority encoder 88 to determine if the operator has pushed one of the manual step switches 34. A step count of seven indicates that no manual step switch has been pushed and the subroutine returns to the main program to enter the JOG subroutine. At this point, it will be noted that the main program continues to recycle, as just described, awaiting further action from the operator either by pushing a manual step switch or by activating the foot switch. If we assume that a manual step switch is now pushed, the Step Search subroutine stores the manually selected step address in the RAM, clears the Step Search flip-flop and blanks all step indicator lights. Following this, it enters the Reader subroutine of FIG. 9 which operates in the manner previously described to store the crimp height count in RAM for the particular selected step and to determine if a stuffer wire is required and then to light the appropriate step indicator LED. Upon returning from the Reader subroutine, the inquiry is again made as to whether the foot switch has been activated and, if not, the Step Search subroutine cycles repeatedly through this inquiry until the operator either actuates the foot switch or pushes the cycle reset button. At this point, it should be noted that once the Step Search subroutine determines that a manual step switch has been pushed, it will lock on to that step exclusively until the step operation is completed (or the cycle reset button is pushed) thus prohibiting the operator from inadvertently confusing the control apparatus by attempting to manually activate another step without first completing the first selected step. Assuming the foot switch is eventually activated, the previously described Crimp subroutine of FIG. 10 is performed following which the subroutine reverts to the step which was last performed in the automatic sequencing cycle as indicated by the previously stored step count in the RAM. After then going through the Reader subroutine to move to the next step in the automatic cycle sequence, the main program is re-entered. Thus, it will be noted that the Step Search subroutine will operate to go to only a single manually selected step following which the program returns to the step in the automatic cycle at which the main program was interrupted to perform the manually selected step.

Figure 15A:
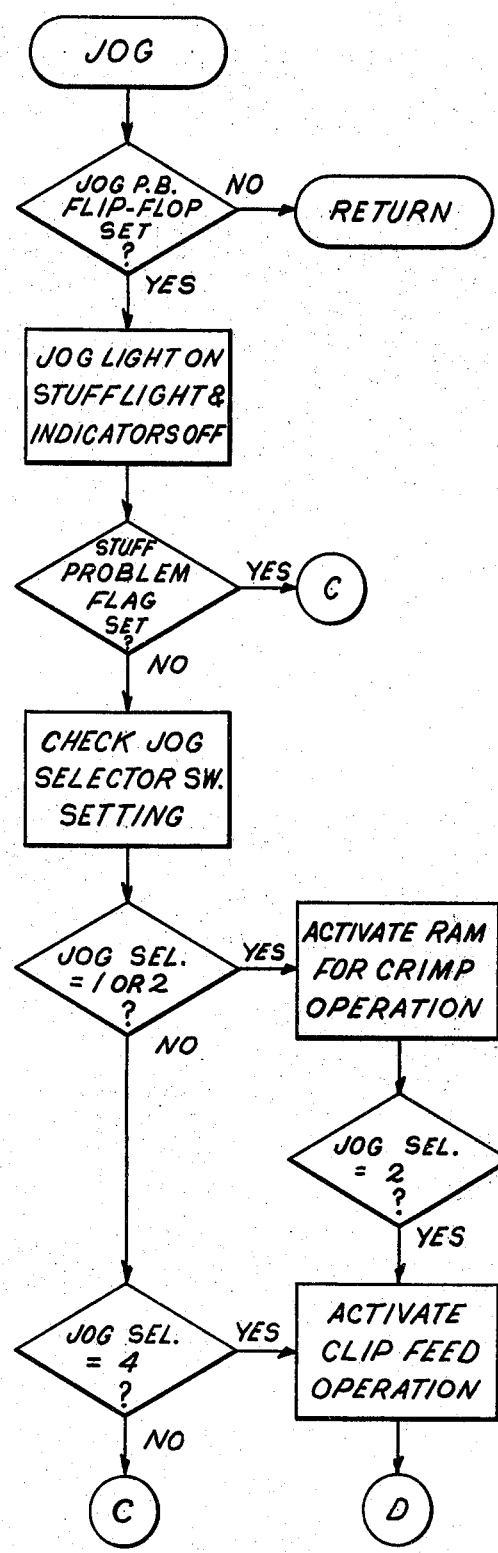
Figure 15B:
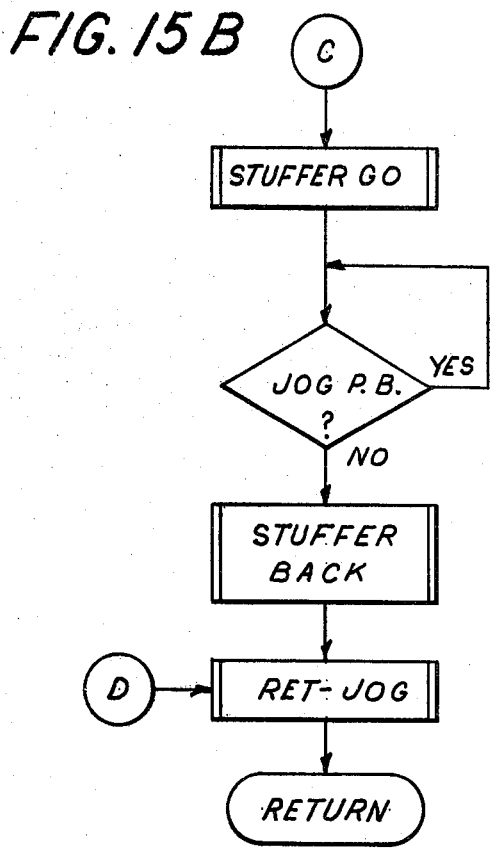
Figure 15C:
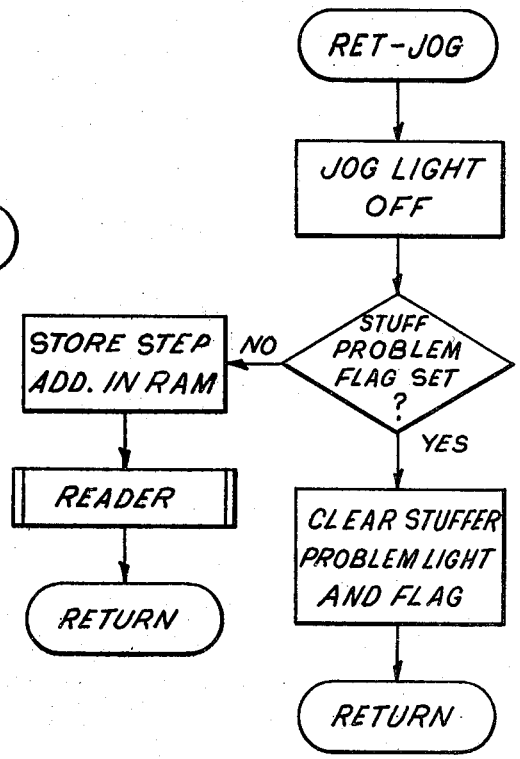

Referring to FIGS. 15a-c, there will now be described the operation of the JOG subroutine which permits the equipment set-up operator to perform selected portions of a crimp step operation. This may be desirable, for example, to examine actuation of the pneumatic ram 12 to assure that a crimp operation is properly accomplished. It may also be desirable in order to repeat a stuffer wire operation as for example when, in the course of a crimp step, the operator becomes aware of the existence of a stuffer problem as indicated by stuffer problem light 47 on control panel 31. Thus, upon entering the JOG subroutine, the JOG flip-flop in buffer circuit 51 is sensed to determine if the operator has actuated JOG pushbutton 45. Under normal conditions in the course of the automatic crimp step operation, the flip-flop is not set and the subroutine returns to the main program. However, assuming the operator has pushed the JOG pushbutton 45, the subroutine actuates the JOG light and blanks the stuffer light and all other indicators. The subroutine then determines if a stuffer problem flag has been set in the microprocessor RAM to cause automatic entry into the stuffer operations shown in FIG. 15b. In performing the stuffer operations within the JOG subroutine as shown in FIG. 15b, the subroutine moves incrementally through the stuffer operation as determined by the operator by pushing the JOG pushbutton. Thus, between the Stuffer Go and Stuffer Back subroutines, the determination is made whether the JOG pushbutton has been released thus giving the operator the ability to observe each increment within the stuffer wire operation to visually check for proper operation. At the end of the stuffer wire operation in the JOG subroutine, the subroutine returns to the main program of FIG. 7 if the operator actuates the stuffer reset button.

Referring again to FIG. 15a, if the stuffer problem flag had not been set, the JOG subroutine would then check the JOG selector switch setting and perform the particular incremental portion of the crimping operation as determined by the particular setting of the Jog selector switch. Thus it will be noted from FIGS. 15a and 15b that even if a stuffer problem had not occurred, it would still be possible for the operator to cause a stuffer operation by selecting position 3 on the selector switch. Near the end of the JOG subroutine in FIG. 15b, a return JOG subroutine is entered as seen in FIG. 15c which blanks the JOG light and determines if the stuffer problem flag is still set. If so, the flag is cleared and the stuffer problem light is blanked before returning to the main program. If the stuffer problem flag is not set indicating that the JOG subroutine had been entered for reasons other than the existence of a stuffer problem, the subroutine identifies the step in the automatic sequence to be performed and enters the Reader subroutine as part of re-entering the main program.

Figure 16:
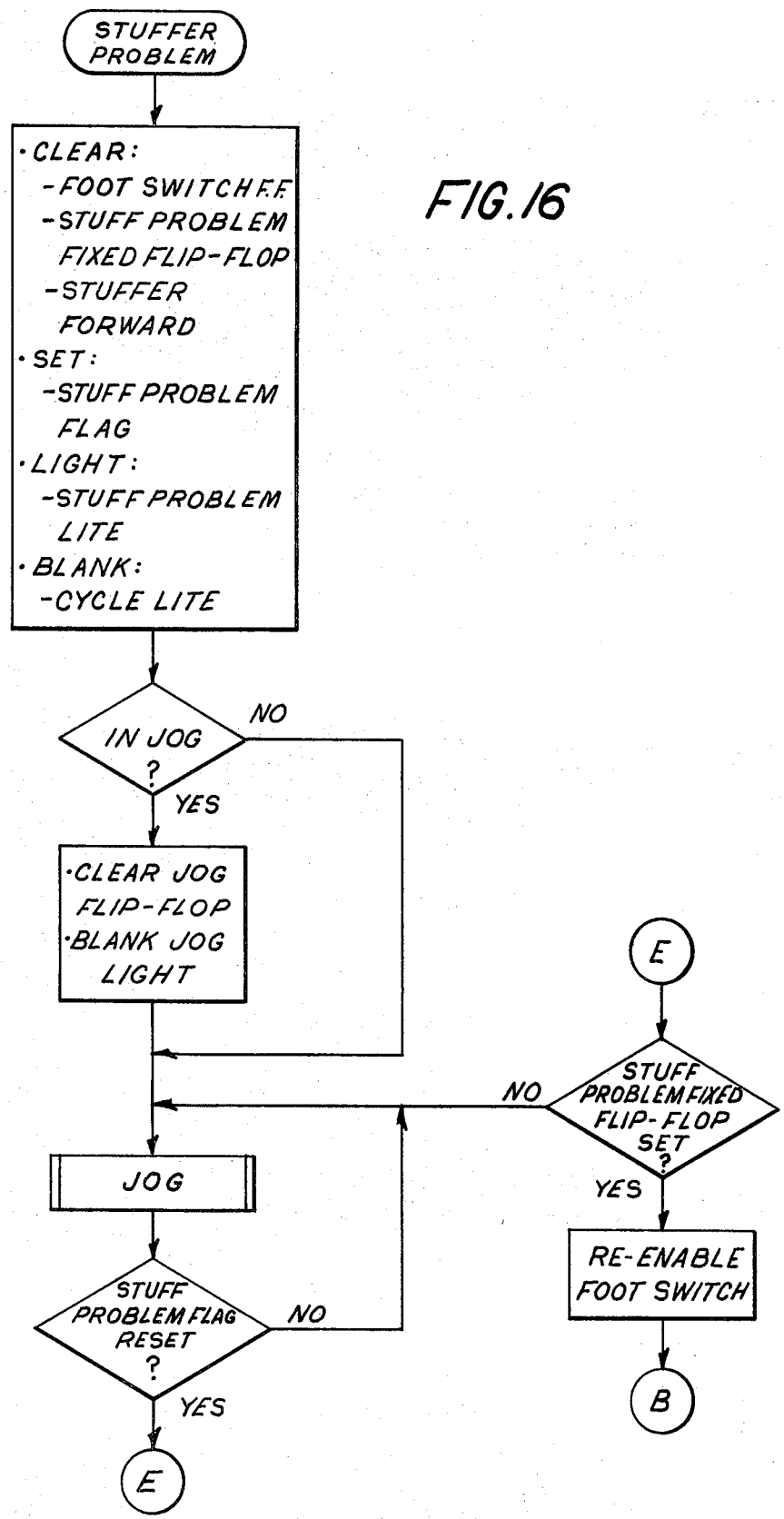

It will be recalled that in the course of the Stuffer Go subroutine of FIG. 12 or the Stuffer Back subroutine of FIG. 13, position sensors on the stuffer solenoid mechanism were sensed to determine the existence of a proper stuffer operation, failing which the program would enter into a Stuffer Problem subroutine which is shown in FIG. 16. Upon entering this subroutine, the foot switch, stuffer problem fixed and stuffer forward flip-flops are cleared. Also, the stuffer problem flag is set, the stuffer problem light is turned on and the cycle on light is blanked. The subroutine then determines if it is already in the JOG subroutine in which case the JOG flip-flop is cleared and the JOG light is blanked. Otherwise, the subroutine automatically enters the JOG subroutine to perform as previously described with respect to FIGS. 15a-c. At the end of the JOG subroutine, if the stuffer problem has not been fixed as indicated by the stuffer problem fixed flip-flop, the stuffer problem subroutine re-enters the JOG subroutine. Normally the equipment operator at this point would either try one or more stuffer operations in the JOG subroutine or call for a service technician to repair the equipment. However, if the stuffer problem is fixed at this point, the operator must actuate the stuffer reset pushbutton 46. Thus, the foot switch is re-enabled and the main program will be entered at the same step in the cycle from which it left, thus assuring completion of the required crimp operation at that step and the resumption of automatic cycle sequence.

From the foregoing description, it will be seen that there has been described control apparatus which substantially simplifies the wire crimping functions from the standpoint of the equipment operator. To this end, the control apparatus operates to permit any desired crimp height setting to be established by the operator without the need for complex and intricate set-up procedures to be performed by a mechanical set-up specialist. In addition, stuffer wire insert operations are performed accurately and automatically with improper stuffer wire operations resulting in a visual indication to the operator so that the stuffer wire insert operation may be repeated in a semi-automatic manner. Finally, semi-automatic control is provided whereby the incremental portion of a crimp may be performed under the manually actuated sequencing control activated by the set-up specialist or the equipment operator to enable a check on the proper operation of the crimping equipment.

While, in accordance with the patent statutes, there has been described what at present is considered to be the preferred embodiment of the invention, it will be apparent to those skilled in the art that various changes and modifications may be made therein without departing from the invention. It is intended, therefore, by the appended claims to cover all such changes and modifications as fall within the true spirit and scope of the invention.

What is claimed is:

1. Automatic control apparatus for wire crimping equipment adapted to make, during a crimp cycle having one or more crimp steps, electrical interconnections with one or more magnet wire segments extending from windings supported on the core of a dynamoelectric machine, the equipment having a crimp height setting mechanism which is substantially infinitely variable over a predetermined range of maximum and minimum height limits, the control apparatus comprising:

first input means for establishing the number of crimp steps to be performed and for generating a signal representative of each step;

second input means for establishing any desired crimp height setting, within said range of maximum and minimum limits, for each crimp step to be performed and for generating a signal representative thereof;

means operative in response to the first and second input means during each crimp step for actuating the crimp height setting mechanism to the setting established for that step;

and crimp actuating means for initiating a crimp operation at each crimp step after the crimp height mechanism has been properly positioned to the corresponding crimp height setting.

2. The automatic control apparatus of claim 1 in which there is included a card receiving means for receiving a data card bearing count indicia representative of crimp height settings for each desired crimp step; and wherein the second input means includes a plurality of switches manually settable by the user for establishment in the control apparatus of binary coded decimal count signals corresponding to the crimp height count indicia appearing on the card.

3. The automatic control apparatus of claim 2 in which the data card additionally includes, along at least one edge thereof, a first set of indicia representative of the number of crimp steps to be performed during the crimp cycle and the first input means includes first card reader means adapted to be responsive to the first set of indicia on the card edge for generating an electric signal representative of the number of crimp steps.

4. Automatic control apparatus for wire crimping equipment adapted to make, during a crimp cycle having one or more crimp steps, electrical interconnections with one or more magnet wire segments extending from windings supported on the core of a dynamoelectric machine, the equipment having a crimp height setting mechanism which is substantially infinitely variable over a predetermined range of maximum and minimum height settings, the control apparatus comprising:

user-operated input means for inserting data representative of any desired crimp height setting within said range of maximum and minimum settings;

first logic circuit means for converting the inserted data to a first electrical signal value;

actuating means responsive to the first logic circuit means for actuating the crimp height setting mechanism toward the desired setting represented by the signal value;

position encoding means responsive to positioning of the crimp height setting mechanism for generating a second electrical signal value indicative of the actual position of the crimp height setting mechanism;

second logic circuit means for comparing said first and second electrical signal values to stop the actuating means when the two signal values are in a predetermined relationship representative of the desired setting of the crimp height setting mechanism;

and means for actuating a crimping operation after the crimp height setting mechanism is properly set.

5. The automatic control apparatus of claim 4 wherein the input means is adapted to establish a numerical count having a predetermined relationship to the desired crimp height setting, wherein the first logic circuit means includes means for storing the inserted count in digital form, wherein the position encoding means generates a pulse train representative of the actual position of crimp height setting mechanism and wherein the second logic circuit means compares the pulse train count from the position encoding means with the stored digital signal count to stop the actuating means when the two counts are equal.

6. The automatic control apparatus of claim 1 in which a plurality of crimp steps are established by the first input means and means are included in the control apparatus for sequencing the crimping operations automatically through each crimp step until the crimp cycle is completed.

7. The automatic control apparatus of claim 6 in which the input means includes means for establishing a single crimp step to be performed out of the plurality of crimp steps and in which the control apparatus includes means for interrupting the automatic sequencing of crimp steps to perform the manually selected crimp step.

8. The automatic control apparatus of claim 7 in which the control apparatus includes means for storing a signal indicating the last crimp step to be performed in the automatic sequence process prior to initiation of the manually selected crimp step and means responsive to the last crimp signal for returning the cycle to said last crimp step in the automatic sequence at the conclusion of the manually selected crimp step.

9. Automatic control apparatus in accordance with claim 1 in which there is included means for establishing for selected crimp steps a signal representative of the need for inclusion of a stuffer wire in such selected crimp steps.

10. Automatic control apparatus of claims 2 or 9 wherein the card includes a second set of indicia along an edge thereof representative of the stuffer requirement for each desired crimp step and the first input means includes second card reader means adapted to be responsive to the second set of indicia on the card edge for generating a second signal representative of the stuffer requirement of each crimp step; the control apparatus further includes means for sensing the condition of the second card reader means during each crimp step to establish a stuffer wire enable signal when so indicated by the card reader; and includes means for enabling the stuffer wire mechanism in response to the stuffer wire enable signal to insert a stuffer wire prior to actuating the crimp operation.

11. Automatic control apparatus in accordance with claim 4 in which means are included to set the crimp height actuating mechanism to a predetermined initial condition upon initiation of a crimping cycle and to reset the crimp height mechanism to said initial condition at the conclusion of the crimp operation.

12. Automatic control apparatus of claim 4 wherein the first logic circuit includes means for storing the inserted crimp height data as a digital signal of a corresponding numerical count and includes means for generating a drive pulse train signal at the beginning of a crimp operation; wherein the actuating means includes a pulse operated stepper motor and a drive circuit therefor responsive to the pulse drive train signal for driving the motor in incremental steps toward the desired position setting of the crimp height mechanism; wherein the position encoding means generates a shaft position encoder pulse train representative of incremental steps of advance of the crimp height setting mechanism; the second logic circuit means develops a digital count in response to the encoder pulse train generating a signal to terminate the drive pulse train when the encoder pulse train count equals the stored count representative of inserted crimp height data.

13. Automatic control apparatus in accordance with claim 9 in which means are included to sense the occurrence of an improper stuffer wire operation and to provide a visual indication thereof to the equipment operator.

14. Automatic control apparatus in accordance with claim 13 in which means are further included responsive to the stuffer problem indicating means to interrupt the sequential processing of the control apparatus through the crimp steps and to substitute a stuffer wire recycle control step therefor.

15. Automatic control apparatus in accordance with claim 13 wherein the equipment includes a stuffer wire feed mechanism; wherein in the control apparatus, means are included for sensing three positions of the feed mechanism: a ready position prior to insertion of the stuffer wire, a forward position in which the stuffer wire is inserted into a crimp clip, and an intermediate position during return of the feed mechanism; wherein timing means are provided to sense a stuffer wire insert problem upon failure of the feed mechanism to proceed first from the ready position to the forward position, and then from the ready position to the intermediate return position each within predetermined time increments associated with the respective movements of the stuffer feed wire mechanism; and wherein means are included for providing an indication of a sensed stuffer wire insert problem.

16. Automatic control apparatus for wire crimping equipment adapted to make, during a crimp cycle having one or more crimp steps, electrical interconnections of one or more magnet wire segments extending from windings supported on the core of a dynamoelectric machine with lead wires or with other magnet wire segments of said machine, the equipment having a crimp height setting mechanism which is substantially infinitely variable over a predetermined range of maximum and minimum height limits, the control apparatus comprising:

first input means for establishing first input conditions representing the number of complete crimp steps to be performed, each crimp step comprising at least a ram operation in which the connector clip is compressed around the wires to be interconnected and a clip feed operation in which a connector clip is fed into a crimp station below the ram and each crimp step additionally comprising an optional stuffer wire insert operation in which a stuffer wire is automatically inserted into the connector clip prior to ram operation;

second input means for establishing second input conditions representing any desired crimp height setting, within said range of maximum and minimum settings, for each complete crimp operation to be performed;

third input means for establishing third input conditions representing any one of or a combination of selected ones of said operations comprising a crimp step;

the first and second input conditions representing an automatic mode of operation and the second and third input conditions comprising a semi-automatic mode of operation;

user-operated means for establishing a signal representative of selection of said semi-automatic mode of operation;

microprocessor means responsive to said input means and to said selection means for sequencing the control apparatus through one or more automatic operating modes until a semi-automatic mode selection signal is sensed upon which each of the selected crimp operations is activated in response to further actuation of said user-operated means.

17. Automatic control apparatus in accordance with claim 16 wherein means are included for sensing an improper condition in the stuffer wire operation and wherein, in response thereto, a microprocessor instruction actuates the semi-automatic operating mode in the wire stuffer operation condition whereby the user may actuate said user-operated means to perform a stuffer wire operation to the exclusion of the other operations in an effort to correct the stuffer wire problem.

* * * * *